UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

ALKAMIN ESTERS AND PROCESS OF PRODUCING SAME.

1,150,253.   Specification of Letters Patent.   Patented Aug. 17, 1915.

No Drawing.   Application filed May 25, 1914.   Serial No. 840,835.

*To all whom it may concern:*

Be it known that I, ALEX B. DAVIS, a citizen of the United States, residing at Indianapolis, Marion county, and State of Indiana, have invented and discovered certain new and useful Improvements in Alkamin Esters and Processes of Producing Same, of which the following is a specification.

This invention relates to esters of alkamins derived from new tertiary halogen carbinols of the general formula:—

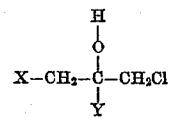

in which X and Y are alkyl, aryl or aralkyl groups. Esters of the alkamins derived from these carbinols are valuable local anesthetics.

The alkamins have the general formula:—

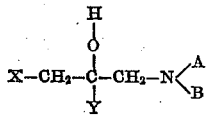

in which X and Y are alkyl, aryl or aralkyl groups and A and B are alkyl and hydrogen. These alkamins when dissolved in a suitable solvent and treated with an acid chlorid or anhydrid yield the corresponding ester or the salt thereof—thus, the alkamin of the formula:

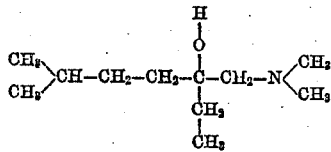

which may be called dimethyl-amino-methyl-ethyl-iso-amyl-carbinol, when dissolved in boiling hot benzol and treated with benzoyl chlorid yields the hydrochlorid of the corresponding ester of the formula:—

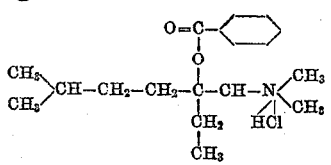

which may be called dimethyl-amino-methyl-ethyl-iso-amyl-carbinyl benzoate hydrochlorid (carbinol benzoyl ester hydrochlorid). This compound when dissolved in water and treated with an alkali yields the free ester as an oil. It has the formula:—

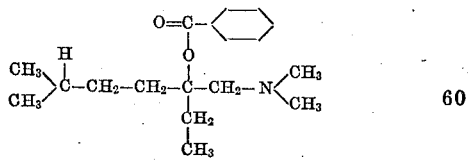

It is a powerful local anesthetic, very soluble in water. In detail its preparation may be carried out as follows—178 grams of the alkamin dimethyl-amino-methyl-ethyl-iso-amyl-carbinol are mixed with 500 c. c. of boiling hot benzol and 140 grams of benzoyl chlorid gradually run into the hot solution which soon begins to show signs of depositing crystals and as it cools, gradually becomes a mass of crystals impregnated with benzol. The benzol is evaporated on the water bath and the residue washed with ether and then dissolved in acetone. The acetone solution is concentrated and allowed to stand, when the new compound separates out in white prismatic crystals. It is purified by recrystallizing from acetone. In case the anhydrid of the acid be used in place of the acid chlorid, some free ester may or may not be produced according to the conditions of the reaction.

What I claim is,

1. An ester of dimethyl-amino-methyl-ethyl-iso-amyl-carbinol.

2. The benzoyl ester of dimethyl-amino-methyl-ethyl-iso-amyl-carbinol which has the probable formula:—

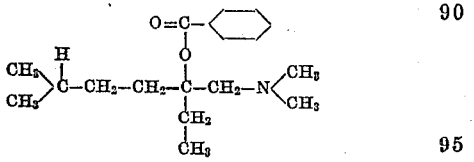

3. The process of producing esters of alkamins which consists in treating dimethyl-amino-methyl-ethyl-iso-amyl-carbinol with a substance containing an acid radical in suitable combination.

In witness whereof, I have hereunto set my hand and seal at Indianapolis, Indiana, this 6th day of May, A. D. nineteen hundred and fourteen.

ALEX B. DAVIS. [L. S.]

Witnesses:
E. G. EBERHARDT,
ARTHUR L. WALTERS.